(No Model.)
A. E. LYTLE.
UNDERGROUND CONDUIT.
No. 315,954. Patented Apr. 14, 1885.
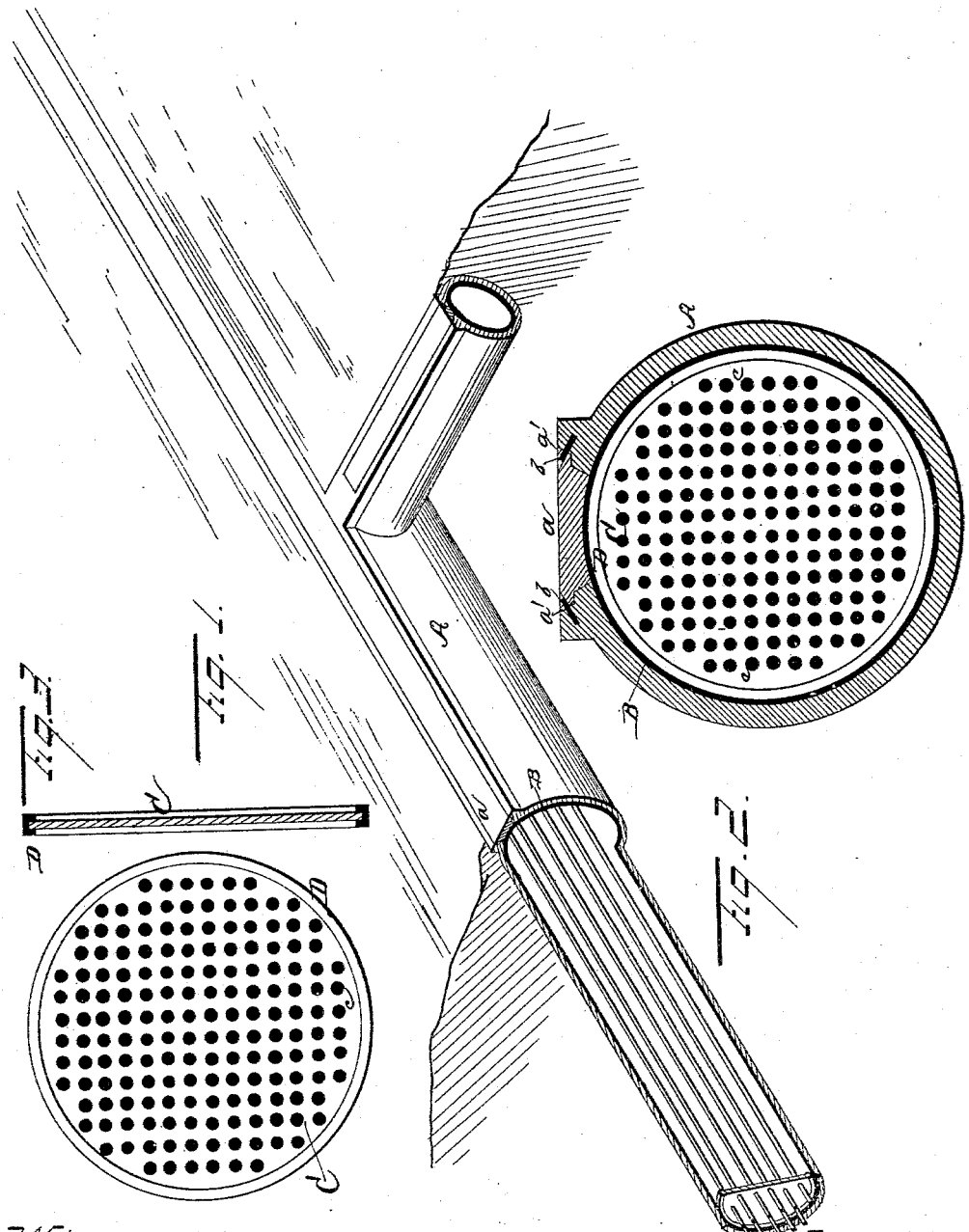
Witnesses:
H. C. McArthur
Chas. Kressmann
Inventor.
Albert E. Lytle
per
H. Harrison
Attorney.

United States Patent Office.

ALBERT E. LYTLE, OF CHICAGO, ILLINOIS, ASSIGNOR OF A PART INTEREST TO ROBERT B. SMITH, OF SAME PLACE.

UNDERGROUND CONDUIT.

SPECIFICATION forming part of Letters Patent No. 315,954, dated April 14, 1885.

Application filed December 17, 1883. (No model.)

*To all whom it may concern:*

Be it known that I, ALBERT E. LYTLE, a citizen of the United States, residing at Chicago, in the county of Cook and State of Illinois, have invented certain new and useful Improvements in Underground Conduits, of which the following is a specification, to wit:

This invention relates to an improvement in underground conduits for electrical conductors; and it consists in the peculiar construction of the same, whereby the conduits are laid just beneath the surface of the ground, and are provided with a removable cover to facilitate access to the interior at all times, substantially as hereinafter more fully set forth.

In order to enable others skilled in the art to which my invention appertains to make and use the same, I will now proceed to describe its construction and operation, referring to the accompanying drawings, in which—

Figure 1 is a perspective view of my device. Fig. 2 is a cross-section of the same; and Fig. 3 is a representation of the insulating supporting-plate.

A represents a cast pipe, of iron or other suitable material, formed in sections of convenient length, which are provided with flanges at their ends for securing them together. These pipe-sections are each formed with a flat upper face, in which is fitted a removable cover, *a a*, having its edges under-beveled or otherwise formed, as seen at *a'*, for making a close joint, and this may be provided with some suitable non-conducting packing, to exclude moisture and prevent the escape of the electrical current. To prevent the accidental displacement of the cover *a*, I provide it at intervals with pins *b*, which pass diagonally through the cover into the sides of the pipe-sections, their heads being recessed and entirely below the surface of the covers, as shown in Fig. 2.

The interior of the pipe or conduit A, I line with asbestus, as seen at B, to effectually insulate the conduit from the wires it contains, and, to support these wires, I place at suitable intervals within the conduit a plate of glass or hard rubber, C, formed of a shape corresponding to the conduit, and provided with any desired number of holes or perforations, *c c*, for the passage of the conducting wires or cables. These plates should be made to fit the conduit moderately close, in order to cause them to retain their position during the pulling in of the wires, and as the contraction of a pipe would in that case break the plate, I provide a soft-rubber ring, D, having a groove, *d*, in its inner side, which fits over the edge of the plate and allows for all expansion and contraction. This conduit is laid with the upper flat surface flush with the level of the ground or street, and as the covers or caps are easily removed at any time a new wire may be laid or any repairs made, as may be desired.

Branches may be made for lateral or service pipes at any points, and these also may be provided with the removable covers, if desired, which are of course constructed of sufficient strength to support the weight of passing vehicles or any load which is likely to be put upon them.

Having thus fully described my invention, what I claim as new, and desire to secure by Letters Patent, is—

1. In an underground electrical conduit, a supporting and insulating plate of glass or hard rubber having a soft rubber ring placed around its periphery between the disk and the side of the conduit, whereby the disk is held in proper position and not injured by the expansion and contraction of the conduit, substantially as shown and described.

2. An underground conduit or tube, A, having covers *a a*, flush with the surface of the ground, and lined with asbestus B, in combination with a series of perforated glass or hard-rubber plates, C, having a grooved soft-rubber ring, D, around their outer edge, substantially as and for the purpose set forth.

In testimony whereof I affix my signature in presence of two witnesses.

ALBERT E. LYTLE.

Witnesses:
CHAS. KRESSMANN,
FRANK JOHNSON.